March 1, 1966     B. H. SANDBERG     3,237,601

EGG HANDLING AND COLLECTING APPARATUS

Filed Feb. 6, 1964     3 Sheets-Sheet 1

INVENTOR.
BRUCE H. SANDBERG
BY Moore, White & Burd
ATTORNEYS

March 1, 1966   B. H. SANDBERG   3,237,601
EGG HANDLING AND COLLECTING APPARATUS
Filed Feb. 6, 1964   3 Sheets-Sheet 2

INVENTOR.
BRUCE H. SANDBERG
BY Moore, White & Burd
ATTORNEYS

INVENTOR.
BRUCE H. SANDBERG
BY Moore, White & Burd
ATTORNEYS

United States Patent Office 3,237,601
Patented Mar. 1, 1966

3,237,601
EGG HANDLING AND COLLECTING APPARATUS
Bruce H. Sandberg, Granite Falls, Minn.
Filed Feb. 6, 1964, Ser. No. 342,928
8 Claims. (Cl. 119—48)

The present invention relates to egg production and more particularly to an improved egg handling and collecting apparatus.

A number of devices have previously been proposed for receiving, conveying and collecting eggs in a poultry house. These prior devices have been to some extent ineffective for various reasons. In some of the devices previously proposed, the eggs must be conveyed vertically as well as horizontally. This subjects them to numerous shocks which are often sufficient to cause breakage. Moreover, these devices are relatively complicated in construction and consequently subject to frequent malfunction or breakdown. In other previous devices of the type described, the eggs passing onto the conveyor belt occasionally strike eggs which are already on the belt thereby breaking a significant number of eggs which are handled each day.

In view of these and other defects inherent in the prior art it is one object of the invention to provide an improved egg handling and collecting apparatus which is relatively simple in construction, reliable in operation and can be constructed at a relatively low cost.

Another object of the invention is the provision of an improved egg handling and collecting apparatus including a means for preventing eggs transferred onto a conveying apparatus from striking and injuring eggs which are already on the conveying apparatus.

Another object of the invention is the provision of an apparatus of the type described including a protection means for preventing the eggs moving onto a conveying apparatus from striking those which are already on the conveying apparatus and for guiding the eggs on the conveying apparatus around the protection means.

Another object of the invention is the provision of an improved egg handling and collecting apparatus including a means for transferring eggs onto a conveying means, a means for preventing the eggs thus transferred onto the conveying means from striking the eggs on the conveying means, further means for moving the eggs thus transferred onto the conveying means away from their initial location on the conveying means at relatively frequent intervals whereby the additional eggs transferred onto the conveying means will not strike those which have previously moved onto the conveying means.

Another object of the present invention is the provision of an improved egg handling and collecting apparatus for a hen house having a plurality of nests, a conveyor belt mounted for longitudinal movement between the nests and adjacent thereto with a provision for reliably transferring the eggs from the nest onto the conveyor means and a protection means extending longitudinally of the conveying means for preventing the eggs which have just been transferred onto the conveyor from striking the eggs already present on the conveyor as well as a means for deflecting the eggs on the conveyor laterally of each of the protection means.

Still another object of the present invention is the provision of an improved egg handling and collecting apparatus including a plurality of nests with a conveyor means mounted adjacent the nests and protectors mounted above the conveyor adjacent each nest, a drive means operatively associated with the conveyor and a timing means connected to the drive means for operating the drive means intermittently so that the eggs which transfer onto the conveyor adjacent each protector will be removed from the area immediately adjacent each nest to protect them from breakage.

In the accomplishment of the foregoing and related ends, a preferred form of the present invention includes a horizontally disposed conveyor member, a drive operatively connected to the conveyor for transporting the conveyor member along a horizontal axis and a protector means positioned adjacent the location at which eggs are transported onto the conveyor for preventing the eggs from striking those already present on the conveyor. Specifically, an elongated longitudinally extending member is positioned over the conveyor and a deflecting means is positioned adjacent thereto for moving the eggs already present on the conveyor laterally of the elongated member.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Figure 1:
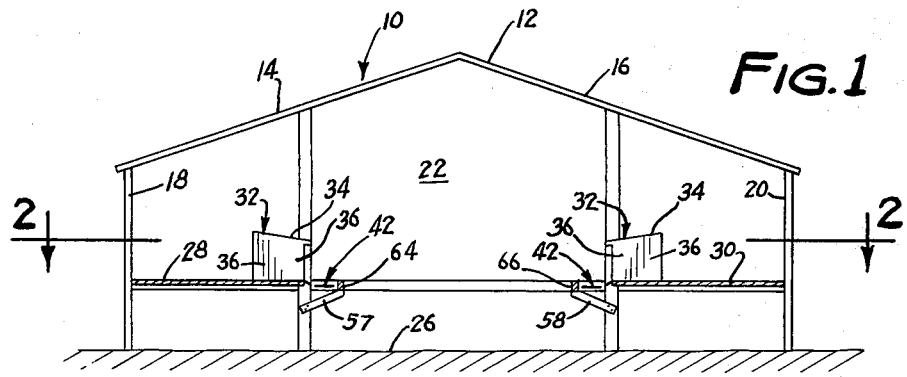
FIGURE 1 is a vertical transverse sectional view of a hen house incorporating an egg handling and collecting apparatus according to the present invention.

Referring now to the figures there is shown in FIGURE 1 a hen house 10 including roof 12 having downwardly inclined roof side portions 14 and 16, side walls 18, 20 and 22 and a floor 26. Extending along each side parallel to the ground or to the floor 26 are raised floor areas 28 and 30. Positioned upon the central edges of the floor areas 28 and 30 are a plurality of nests 32 including inclined upper walls 34, side walls 36 and front walls 38. At least one side of each nest is opened so that the chickens may enter the nests as desired. Preferably the back of the nest, that is to say the wall opposite wall 38, is left open.

Figure 6:
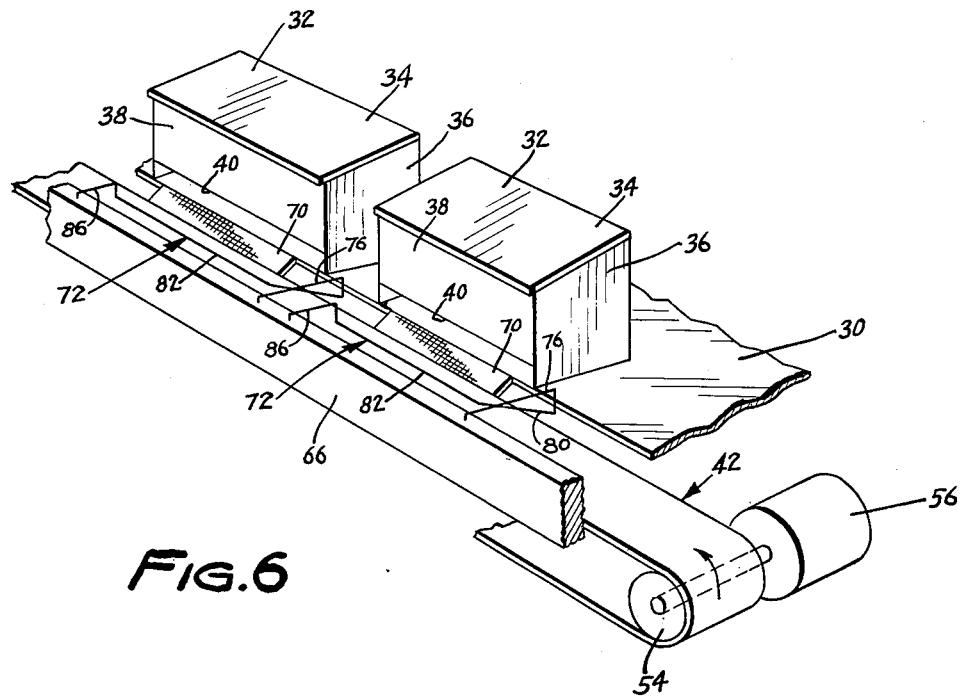
FIGURE 6 is a partial perspective view of the conveyor, deflecting mechanism and drive means.

As best seen in FIGURE 6 an opening 40 is provided beneath each of the walls 38 through which the eggs may pass or roll downwardly under the influence of gravity as they are laid. While one form of nest has been illustrated by way of example, other types of nest which are well known will be apparent to those skilled in the art.

Figure 2:
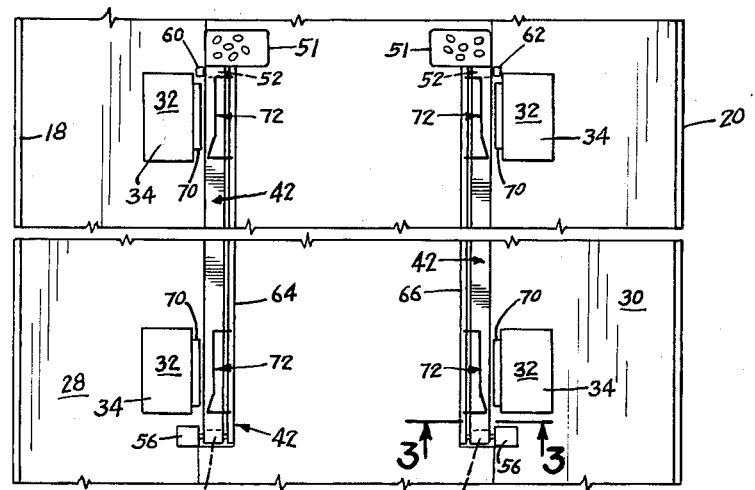
FIGURE 2 is a partial horizontal sectional view taken on line 2—2 of FIGURE 1.
Figure 3:
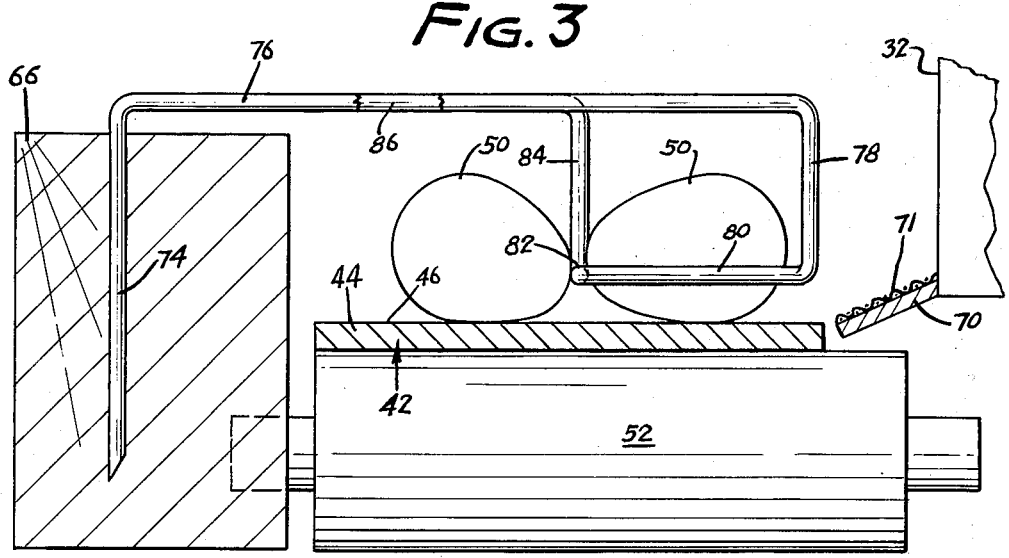
FIGURE 3 is a vertical transverse sectional view taken on line 3—3 of FIGURE 1 and on an enlarged scale.
Figure 4:
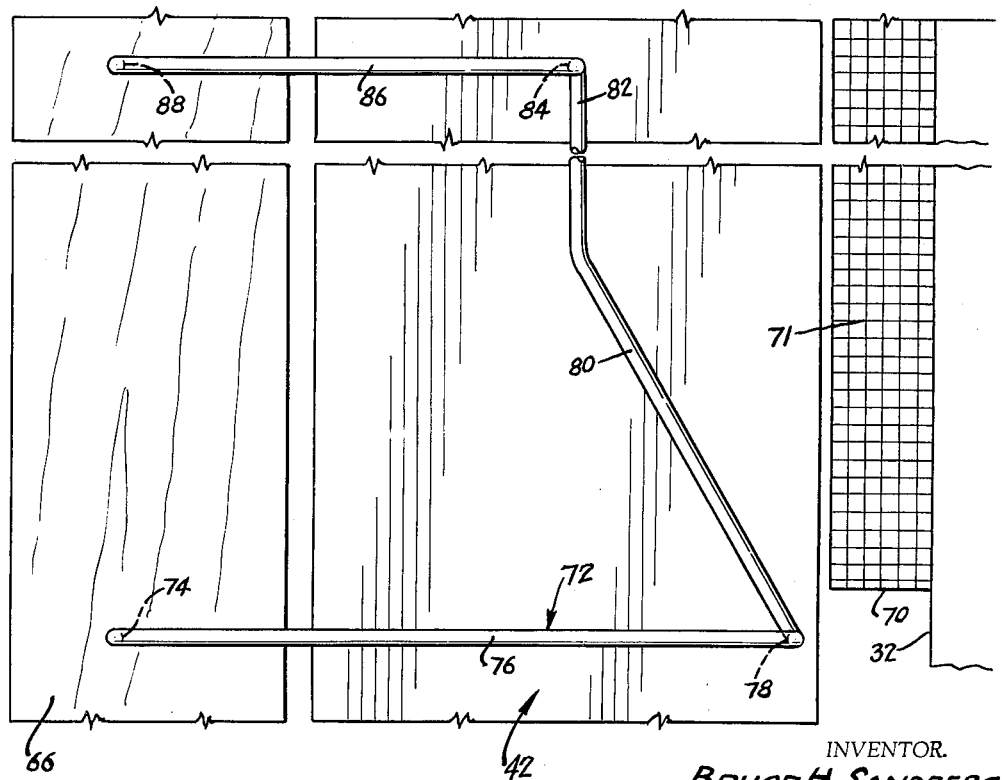
FIGURE 4 is a partial plan view of FIGURE 3.

Positioned laterally of the nest 32 are identical egg transport means such as conveyors 42 composed of flexible conveyor belt 44 having horizontally disposed upward surface 46 upon which eggs 50 rest when the apparatus is in operation. At the downstream end of each conveyor 42 is a suitable tray or table to receive the eggs as shown in FIGURE 2. Each of the belts 44 is entrained over a roller 52 at one end and a roller 54 at the other end (FIGURES 3 and 6). Each of rollers 54 is suitably coupled to a drive motor 56. The rollers 54 and 52 can be supported in any suitable and well known manner as by wooden support brackets 57 and 58 while the rollers 52 can be supported by means of suitable brackets 60 and 62 as best seen in FIGURE 2.

Suitably secured between the free ends of the brackets 57, 58, 60 and 62 are longitudinally extending and horizontally disposed support members 64 and 66 each composed of a rectangular wooden board. Extending downwardly at an inclined axis from each of the nests to the conveyor 42 is an inclined ramp or transfer means 70 which is preferably covered with a mesh such as a metal screen 71. During operation, the eggs which are laid by the chickens within the nests 32 will roll under the influence of gravity from the nests 32 down the ramp 70 and onto the conveyor 42.

As best seen in FIGURES 3, 4, 5 and 6, there is mounted upon the supports 64 and 66 at longitudinally spaced intervals and adjacent each of the nests 32 an egg protection means comprising a wire 72.

The wire 72 includes a vertically disposed portion 74 connected to the support 66, a portion 76 extending from the top of portion 74 toward the nest, a portion 78 extending downwardly from the inward end thereof, an oblique portion 80 extending horizontally from the bottom of the portion 78 toward the center of the belt 44, a protection portion 82 which extends longitudinally of the conveyor parallel to the path of movement of and spaced slightly above the conveyor as can be best seen in FIGURE 3. At the downstream end of the portion 82 is an upwardly extending portion 84 and at the upward end thereof horizontally extending portion 86 and downwardly extending terminal portion 88. While the protection means can be formed from a variety of material, 12 gauge nickel plated spring steel wire has been found satisfactory.

Figure 5:
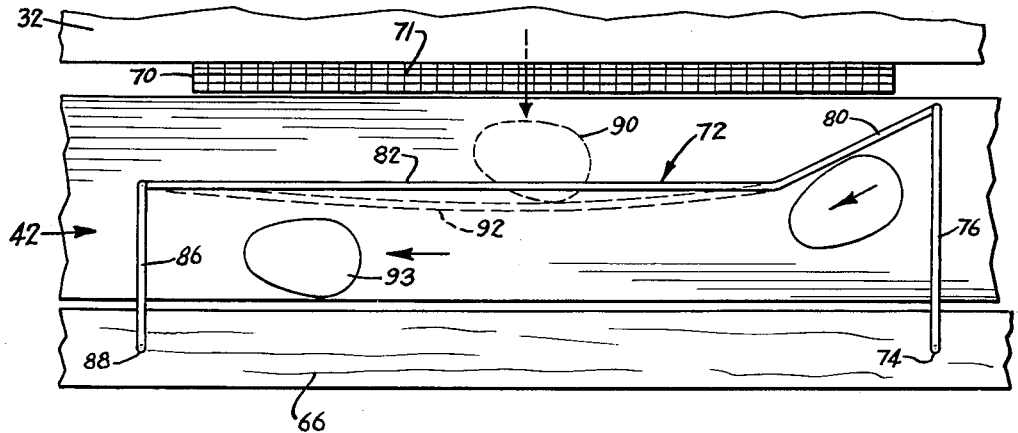
FIGURE 5 is a plan view of the apparatus of FIGURE 2 on a somewhat reduced scale relative to FIGURE 4.

As best shown in FIGURE 5, during operation when an egg 90 strikes the protector portion 82 it will be depected away from the nest as at 92 thereby absorbing the kinetic energy of the egg and preventing breakage thereof or the opportunity for the egg 90 to strike one of the eggs 93 which has already transferred to the conveyor at a point upstream.

Figure 7:
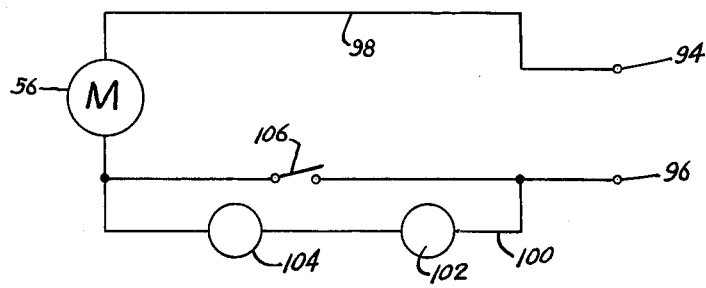
FIGURE 7 is a schematic wiring diagram in accordance with the preferred form of the invention.

As can be seen in FIGURE 7, current is supplied to the drive motor 56 from a suitable source of current applied across terminals 94 and 96 through lines 98 and 100. In series with the motor 56 in the line 100 is a first timing means such as a motor operated switch 102 in series with a second timing means such as a motor operated switch 104 for completing the circuit to the motor 56 for a predetermined period at timed intervals. Wired in series with the motor 56 is a selectively operable means or manual switch 106 for by-passing both of switches 102 and 104. In practice, the timing switch 104 can be set to close about every three-ten minutes and remain closed for four seconds. The timing switch 102 can be set to remain closed between, for example, 6:00 a.m. and 5:00 p.m. Each closure of switch 104 will advance the belt only a limited distance, for example, on the order of about two feet thereby removing the eggs 90 every three minutes from their position on the same side of the protector portion 82 as the nest so that additional eggs which roll down the ramp 70 onto the belt will not strike those which are already between the protector portion 82 and the nest. As the conveyor transfers the eggs horizontally, the guide portion 80 will function to deflect the eggs from upstream to the opposite side of protection portion 82 from the nest where they will be inaccessible to the eggs rolling onto the conveyor as at 90.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An egg collecting apparatus in combination with an egg laying enclosure, a ramp extending downwardly therefrom, a conveyor at the lower end of the ramp, a flexible resilient egg protecting means at the lower end of the ramp and positioned over the conveyor, said protecting means having a first portion adjacent the egg laying enclosure for absorbing the kinetic energy of the eggs passing onto the conveyor from the ramp and for preventing the eggs which roll onto the conveyor from striking eggs already present on the conveyor and a second portion for deflecting the eggs upstream of the first portion to the side of the conveyor opposite the egg laying enclosure.

2. In an egg collecting apparatus for a hen house having a nest, the combination of a horizontally disposed conveyor means, an elongated resilient and flexible protection member positioned over the conveyor said member having a first portion positioned adjacent the nest for preventing eggs which roll onto the conveyor means from striking the eggs already present on the conveyor means and a second portion attached to the upstream side of the first portion for directing the upstream eggs on the conveyor means to the side opposite the nest.

3. In a hen house having a nest, the combination of a conveyor belt, rollers supporting the conveyor belt at each end and a motor driving said conveyor belt, the improvement comprising an elongated resilient means positioned above the conveyor belt adjacent each nest and extending longitudinally thereof for preventing the eggs which roll onto the conveyor belt from striking the eggs already present on the belt and an oblique guide at the upstream side of said means for deflecting the eggs upstream to the side thereof opposite the nest.

4. The apparatus according to claim 3 wherein said means comprises a steel wire.

5. The apparatus according to claim 3 wherein the guide means comprises a portion of said wire positioned in a horizontal plane and extending obliquely toward one side edge of said conveyor belt from the upstream end of the means.

6. In an automatic egg handling and collecting apparatus for a hen house having a plurality of nests therein and a conveyor belt mounted horizontally and positioned laterally of the nests, the improvement comprising a guide means adjacent each nest for deflecting the eggs traveling towards the conveyor belt from each respective nest to the side of the conveyor belt opposite each said nest and a member extending generally longitudinally of the conveyor belt and positioned thereover between and adjacent each nest for segregating the eggs already on the conveyor belt from those which roll onto the conveyor belt from each nest.

7. In an automatic egg handling and collecting apparatus of a hen housing having a plurality of nests therein, a conveyor belt, rollers supporting said belt and a drive means operatively connected to the rollers, the improvement comprising a combined guide and egg protector including a pair of vertically disposed portions supported adjacent the belt, a pair of horizontally disposed portions extending transversely of the belt thereabove from the upper ends of the vertical portions, a downwardly extending portion at the free ends of the horizontally disposed portions, an obliquely disposed guide portion at the bottom end of one of the downwardly extending portions, a longitudinally extending protection portion positioned above the belt adjacent one of said nests between the other downwardly extending portion and the oblique portion.

8. An egg handling and collecting apparatus for a hen house having a plurality of horizontally spaced apart nests therein comprising in combination a horizontally disposed conveyor belt, rollers supporting the conveyor belt at each end, a drive motor connected to at least one of said rollers and timing means operatively associated with the motor, a support means positioned laterally of the conveyor belt, an egg protection means mounted upon the support means and located laterally of each of the nests, said protection means including an elongated portion positioned above the belt formed from a resilient material for absorbing kinetic energy of the eggs passing out of each said nest and a guide at the upstream end of each of the protection means for deflecting the eggs passing toward each protection means to the opposite side thereof from the nest adjacent thereto, the eggs passing onto the conveyor belt from each nest being thereby segregated from the eggs which are already on said conveyor belt and an egg receiving table adjacent the downstream end of the conveyor belt for receiving the eggs which pass off the end of the conveyor belt.

References Cited by the Examiner

UNITED STATES PATENTS

| | | | |
|---|---|---|---|
| 2,264,156 | 11/1941 | Apple | 119—48 |
| 2,745,379 | 5/1956 | Schmidt | 119—48 |
| 2,833,246 | 5/1958 | Weber | 119—48 |
| 2,982,471 | 5/1961 | Eggink | 119—48 X |
| 3,109,413 | 11/1963 | Patchett | 119—48 |
| 3,134,359 | 5/1964 | Byrnes | 119—48 |
| 3,139,065 | 6/1964 | Willauer | 119—48 |

SAMUEL KOREN, *Primary Examiner.*

ALDRICH F. MEDBERY, *Examiner.*